United States Patent [19]

Williams et al.

[11] 4,141,775

[45] Feb. 27, 1979

[54] HYDRAULIC BOARD-LAMINATING PRESS

[75] Inventors: Vernon L. Williams; Glen A. Westfall, both of Cottage Grove, Oreg.

[73] Assignee: Bohemia, Inc., Eugene, Oreg.

[21] Appl. No.: 824,087

[22] Filed: Aug. 12, 1977

[51] Int. Cl.[2] .............................................. B32B 31/00

[52] U.S. Cl. .................................... 156/358; 100/232; 100/237; 156/563; 156/580; 156/566

[58] Field of Search ............... 156/288, 563, 307, 566, 156/312, 580, 559, 358; 100/42, 237, 232; 198/457; 214/6 G

[56] References Cited

U.S. PATENT DOCUMENTS

| | | | |
|---|---|---|---|
| 2,172,093 | 9/1939 | Thompson et al. | 156/258 |
| 2,290,548 | 7/1942 | Galber | 156/312 |
| 2,300,728 | 11/1942 | Goss | 156/312 |
| 2,658,630 | 11/1953 | Melin | 214/6 G |
| 2,919,732 | 1/1960 | McKean et al. | 156/566 |
| 3,367,823 | 2/1968 | Clausen et al. | 156/559 |
| 3,524,785 | 8/1970 | Feiglin | 156/580 |
| 3,616,090 | 10/1971 | Larson | 156/563 |

*Primary Examiner*—William A. Powell
*Assistant Examiner*—J. J. Gallagher

[57] ABSTRACT

A hydraulic board-laminating press comprises a series of laterally aligned hydraulic clamps supported in an inclined plane, each clamp having one fixed and one movable clamping jaw defining an upwardly opening mouth for receiving boards. The positions of the fixed jaws are adjustable along the inclined plane for providing camber in the beam produced. A series of infeed conveyor arms spaced along the lower side of the press deliver boards, adhesive-coated on one face, edgewise and one at a time into the mouths of the clamping jaws. An outer section of each conveyor arm can be extended and retracted toward and away from the clamps and can be raised and lowered so that the outer ends of the arms deliver boards into various positions within the space between jaw pairs to stack boards within the jaws along the inclined plane of the clamps. When the clamp spaces are filled with multiple stacks of boards, a low clamping pressure is applied to the stacks through the clamping jaws in a direction paralleling the inclined plane. Then overhead alignment bars operated by hydraulic pressure are lowered between adjacent clamps to apply edgewise squaring pressure to the board stacks within the clamps. While the alignment bars continue to apply a squaring pressure, a high bonding pressure is applied to the stack through the clamping jaws and maintained until the adhesive between boards has set.

16 Claims, 29 Drawing Figures

HYDRAULIC BOARD-LAMINATING PRESS

BACKGROUND OF THE INVENTION

1. Field of the Invention

The present invention relates to a board-laminating press and to a method of forming laminated wooden beams and the like.

2. Description of the Prior Art

According to the prior art, laminated wooden beams are formed from boards, adhesive-coated on one face, stacked in horizontal rows between pairs of jaws of a series of laterally aligned and closely spaced-apart screw clamps. Each set of screw clamps has a capacity of only two rows of boards, one row above the other. When the clamps are filled, each individual clamp is separately closed and tightened by hand to apply the desired pressure to the rows within the clamping jaw pairs. Because of the many separate clamps and screws involved, the clamping operation, as well as the release of the clamping jaws after the glue has set, is time consuming and requires many workmen to accomplish within a reasonable time. Moreover, because the screw of each separate clamp must be individually hand-tightened, it is difficult, if not impossible, to set all clamps so as to apply the same and the desired clamping pressure. According to this prior clamping technique, six to eight workmen are required to work four to five hours to lay up and clamp boards to form a typical quantity of laminated beams.

Accordingly, there is a need for a faster, more precise method and system for forming laminated wooden beams, using less manpower than previously required.

SUMMARY OF THE INVENTION

The present invention comprises a new and improved method of laying up and forming laminated wooden beams and similar structures and to an improved hydraulic board-laminating press. The present invention also includes as part thereof an improved board infeed means to facilitate laying up boards in the press of the system. In a prototype of the invention, the press can be loaded and activated by three workers in 55 minutes, a substantial improvement over the aforementioned prior press.

One primary object of the present invention is to provide a board-laminating method and system which is faster than prior such methods and systems.

Another primary object is to provide a board-laminating method and system which requires less labor than prior such methods and systems.

A third primary object is to provide a board-laminating method and system in which boards can be laminated under more uniform and precisely controlled bonding pressures than heretofore possible with prior such methods and systems.

A more specific object of the invention is to provide an improved hydraulic laminating press.

Another specific object is to provide an improved hydraulic board-laminating clamp, multiples of which are used in the board-laminating press.

A further specific object is to provide an improved infeed conveyor means for conveying boards to the laminating press of the invention to facilitate the lay-up of boards in the press with maximum speed and a minimum of handling.

In a preferred form of the invention, the board-laminating press comprises a series of laterally aligned hydraulic pressure-operated clamps mounted in an inclined plane with each clamp having a lower fixed jaw and an upper movable jaw. The lower fixed jaws are adjustable to provide camber or curvature in the beam to be formed. Multiple infeed conveyor arms arranged along the line of clamps feed boards which have been coated with glue on one face one at a time edgewise toward the line of clamps. Each conveyor arm has an outer offbear section which can be extended and retracted and also raised and lowered to deliver each board to a selected position within the clamping space defined by the pairs of clamping jaws.

When the pairs of clamping jaws have been filled with multiple stacks of lumber extending in the inclined plane of the clamps, the movable jaws are closed to apply a uniform low clamping pressure to the stacks in a direction paralleling the inclined plane of the clamps. Then alignment bars extending over and paralleling the inclined plane of the clamps are hydraulically lowered to apply side pressure to the stacks to square and hold them while the low clamping pressure is maintained. Thereafter a high bonding pressure is applied to the stacks through the clamping jaw pairs and is maintained until the glue has cured to form the laminated beams.

The movable clamping jaws of the multiple clamps are connected to a common low pressure hydraulic circuit and also to a common high pressure hydraulic circuit independent of the low pressure circuit. Through these two circuits the clamping pressure desired can be applied uniformly to all clamps. The same hydraulic systems also serve the other hydraulically operated components, including the alignment bars and infeed conveyor functions. The latter functions are controlled by a single operator at a remote control panel.

The foregoing and other objects, features, and advantages of the present invention will become more apparent from the following detailed description which proceeds with reference to the accompanying drawings.

DETAILED DESCRIPTION OF A PREFERRED EMBODIMENT

General Assembly, Operation and Method

Figure 1:
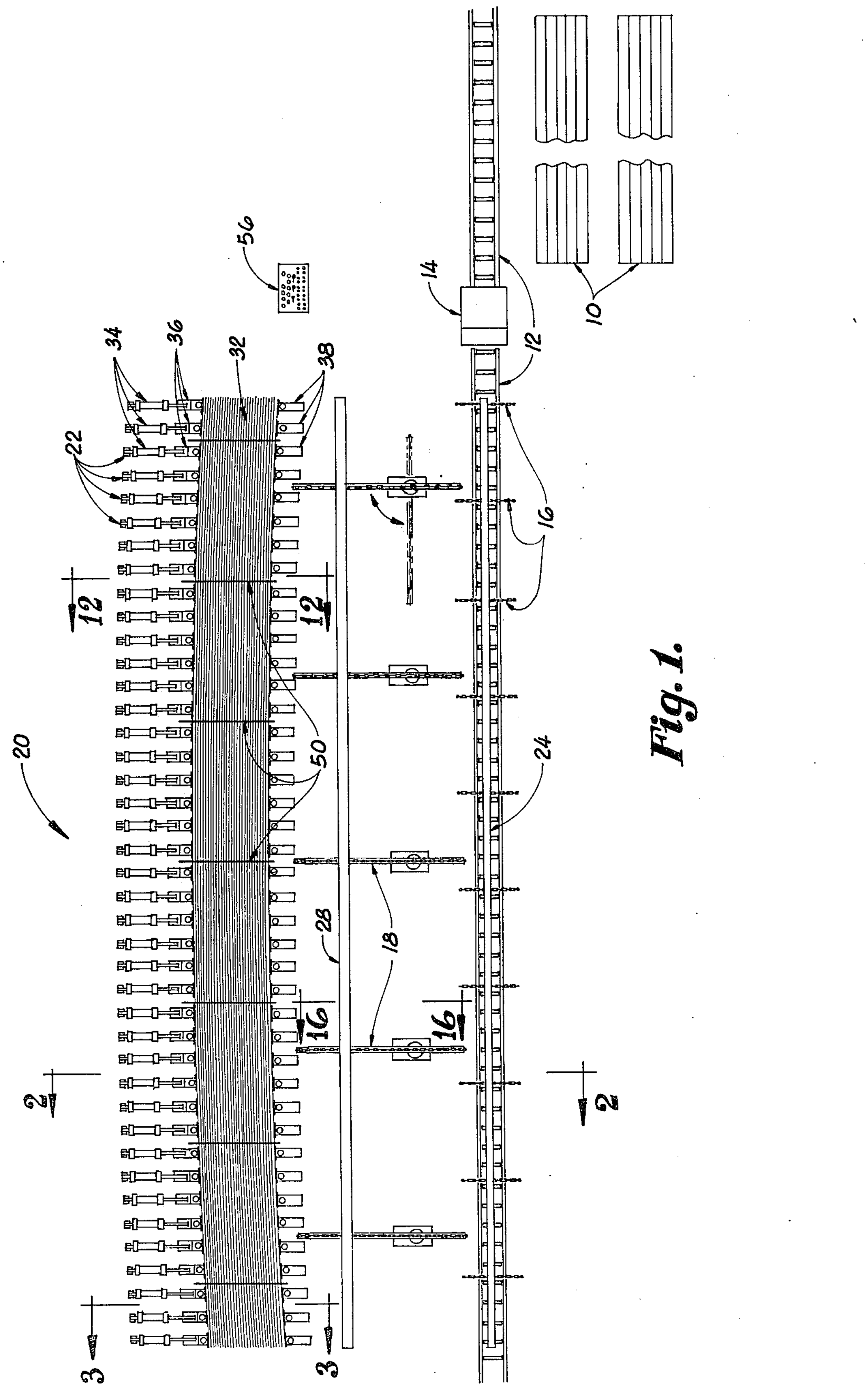
FIG. 1 is a plan view of a board-laminating press and board delivery system in accordance with the invention.
Figure 2:
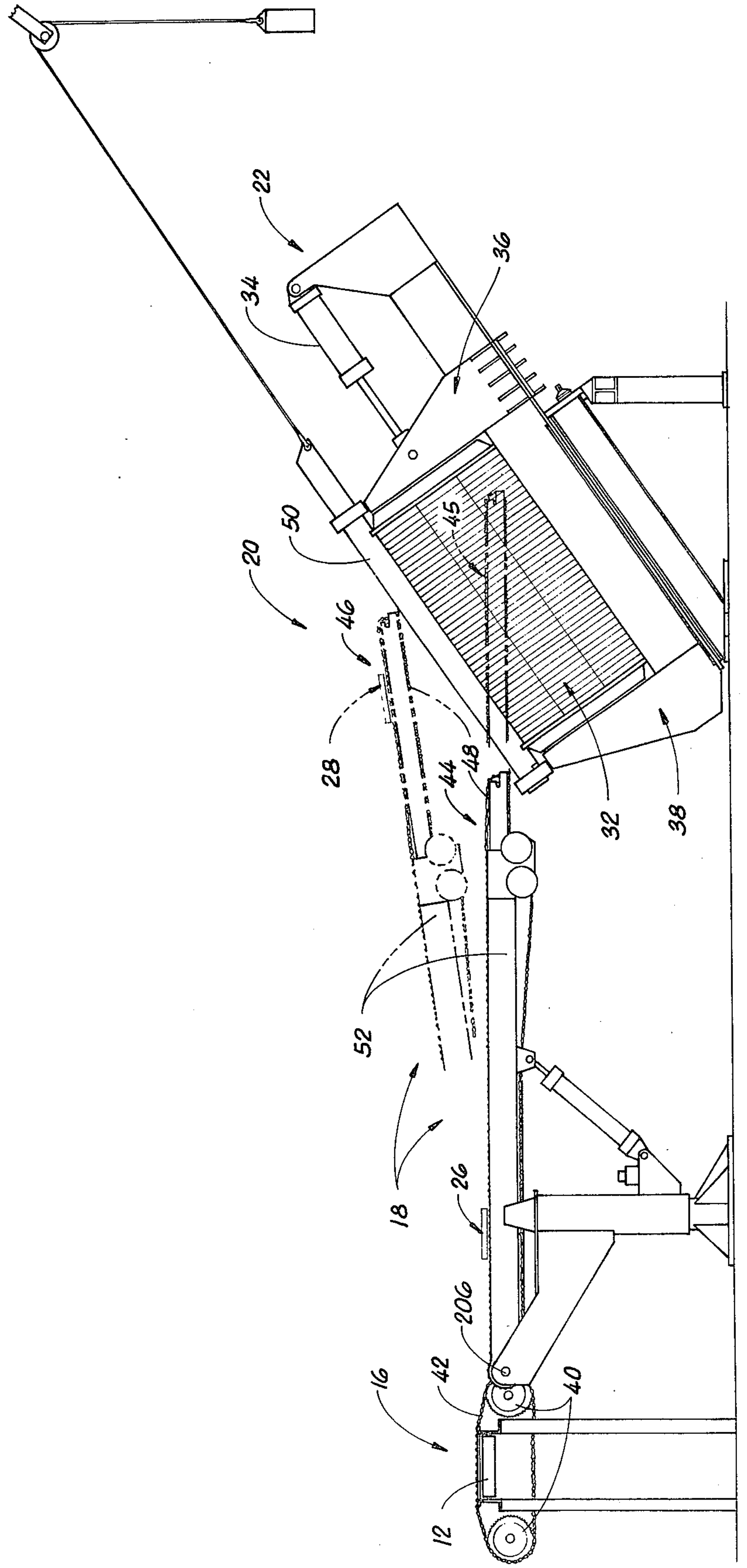
FIG. 2 is a vertical sectional view taken along the line 2—2 of FIG. 1.

Referring to the drawings, FIG. 1 shows the layout of a board-delivery and -laminating system of the invention including a lumber supply 10, a powered roller conveyor 12 for conveying boards 24 endwise therealong one at a time, and a glue applicator 14 for applying glue to the upper surface of each board traveling along conveyor 12. A powered transfer chain conveyor 16 is provided at intervals along the longitudinal roller conveyor 12 downstream of the glue applicator. The upper run of transfer chain conveyor 16 normally lies below the upper surface of roller conveyor 12, but can be selectively raised above the level of the rollers as shown in FIG. 2 to lift a board therefrom and transfer it sideways to a powered chain-type infeed conveyor means including multiple extensible infeed conveyor arms 18. Such arms deliver boards, such as board 28 shown, to a laminating press 20 shown paralleling roller conveyor 12.

Figure 28:
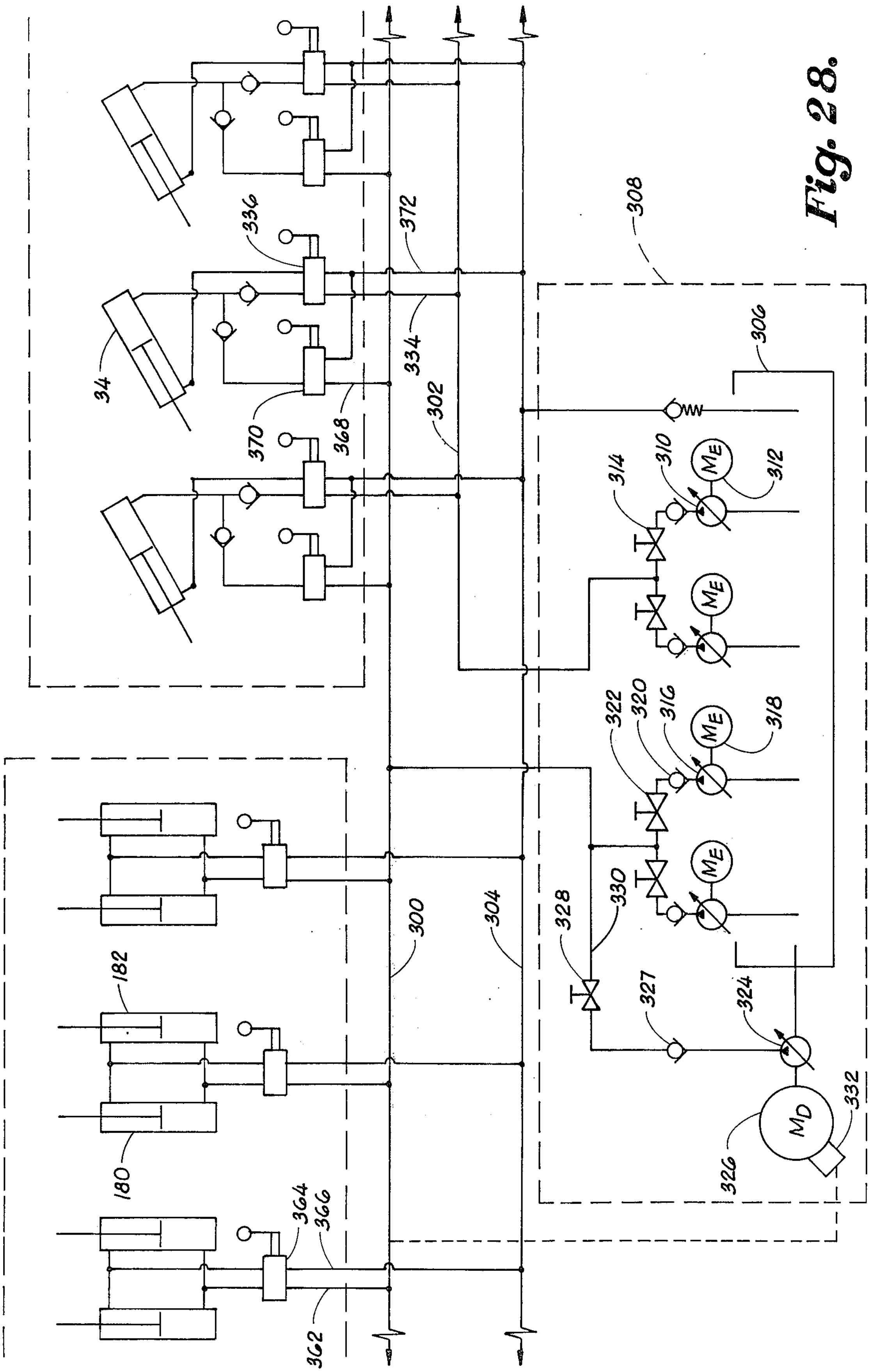
FIG. 28 is a hydraulic circuit diagram of the hydraulic circuit for operating the laminating press alignment bars and upper platens.

Laminating press 20 comprises a series of generally laterally aligned and closely spaced-apart hydraulic pressure-operated clamps 22 which are operated from common low-pressure and high-pressure hydraulic systems (FIG. 28). Each clamp 22 includes a hydraulic cylinder 34 which operates an upper movable clamping jaw or platen 36, and a lower stationary jaw platen 38. The stationary lower jaws 38 support stacks of lumber within the clamps from below and are adjustable with respect to one another to provide camber (curvature) to the beams being formed to satisfy engineering and architectural requirements. Alignment bars 50, positioned over the stacks 32 and between adjacent clamps can be lowered hydraulically against the sides of the stacks to square the same.

As shown in FIG. 2, hydraulic clamps 22 of laminating press 20 are mounted at an inclination to the horizontal so that the movable clamping jaws 36 lie above stationary jaws 38. The preferred angle of inclination is shown to be about 35°, although the angle may be varied somewhat from this in either direction. It has been found that a 35° angle provides for easy access of conveyor arms 18 into the space between the upper and lower clamping jaws to facilitate the placement of boards at various positions within such space with a minimum of manual handling. Such angle also enables the laminated stacks 32 within the jaw space to be removed generally vertically from between the jaws upon completion of the laminating process by the use of, for example, an overhead crane. It will be appreciated that the smaller the angle of inclination of the press the easier will be vertical removal of the completed beams therefrom, but the more difficult will be the access of the conveyor arms to the space between clamps. Conversely, the greater the angle of inclination, the easier will be the access of the conveyor arms to the clamping jaw spaces, and the more difficult will be the vertical removal of laminated beams from the press. Therefore the angle of inclination selected is necessarily a compromise to enable achievement of both objectives.

Still referring to FIG. 2, each transfer conveyor 16 includes two sprockets 40 and an endless chain 42, together with a chain drive and hydraulic elevating mechanism as commonly used in lumber-handling operations. When actuated remotely by the operator, transfer conveyor 16 is elevated above the upper level of roller conveyor 12 as shown, lifting a board from the roller conveyor. The board then rides on transfer chain 42 to the right in FIG. 2, and is deposited on a conveyor chain of the extensible conveyor arm 18. The drive for the conveyor chain on conveyor arm 18 is remotely controlled by the operator to deliver a board to the workmen at the press; see, for example, board 28 approaching the offbear end of conveyor arm 18. Also, by remotely controlling operation of the conveyor arm chain, the operator can hold a board back from the press until needed; for example, in the board position shown at 26.

Each conveyor arm 18 has an outer section 48 which can be telescopically extended and retracted relative to an inner arm section 52. The outer arm section can also be raised and lowered to various vertical positions by pivoting the arm assembly about the inner end of the inner arm section at 206. For example, in FIG. 2, the conveyor arm assembly 18 is shown in a raised and extended position at 46, in a lowered and retracted position at 44, and in a lowered and extended position at 45. Any combination of extended or retracted and raised or lowered positions of the conveyor arms 18 can be achieved as desired to deliver boards through the upwardly opening mouths of the clamping jaws and to various positions within such jaws for convenient and minimum handling by the workmen. The boards are placed in the jaws in inclined rows or stacks as shown, progressing from the lower inside at lower jaw 38 to the upper outside at upper jaw 36.

Describing the operation of the system, lumber which has been finger-jointed or otherwise joined endwise into long boards from supply stacks 10 is loaded one board at a time onto roller conveyor 12 upstream from glue applicator 14. Thereafter each board moves through the glue applicator and continues along roller conveyor 12 to the position indicated by board 24. Then transfer conveyor chains 16 are raised to lift each glue-coated board in succession from roller conveyor 12 and transfer it to the infeed conveyor arms 18, which convey it toward the laminating press 20. At the press, each board is placed between the upper and lower clamping jaws 36, 38 in a stack.

When some of infeed conveyor arms 18 are not in use (for example, when the full length of the press is not used because of the short lengths of beams to be formed), those infeed conveyor arms not needed can be swung to out-of-the-way positions paralleling the press and roller conveyor as shown at 30 in FIG. 1.

When the laminating press 20 is fully charged with lumber as shown at 32, hydraulic cylinders 34 of the individual clamps apply force through their upper movable jaws 36 to the upper surfaces of the stacks of lumber 32 positioned between such upper jaws and the stationary lower jaws. The initial application of force is under nominal pressure to consolidate the stacks. Then, with the stacks still under low clamping pressure, alignment bars 50 are manually pulled down from a storage position (see FIG. 12) and hydraulically lowered normal to the inclined plane of the press against the sides of the stacks 32 to square and hold them in position. Thereafter, while the side-squaring pressure is maintained, a high glue-bonding pressure is applied to the stacks in a direction parallel to the inclined plane of the press through the clamp jaws by hydraulic cylinders 34. The high pressure is maintained until the glue has cured.

Laminating Press

Figures 3, 4, 5:
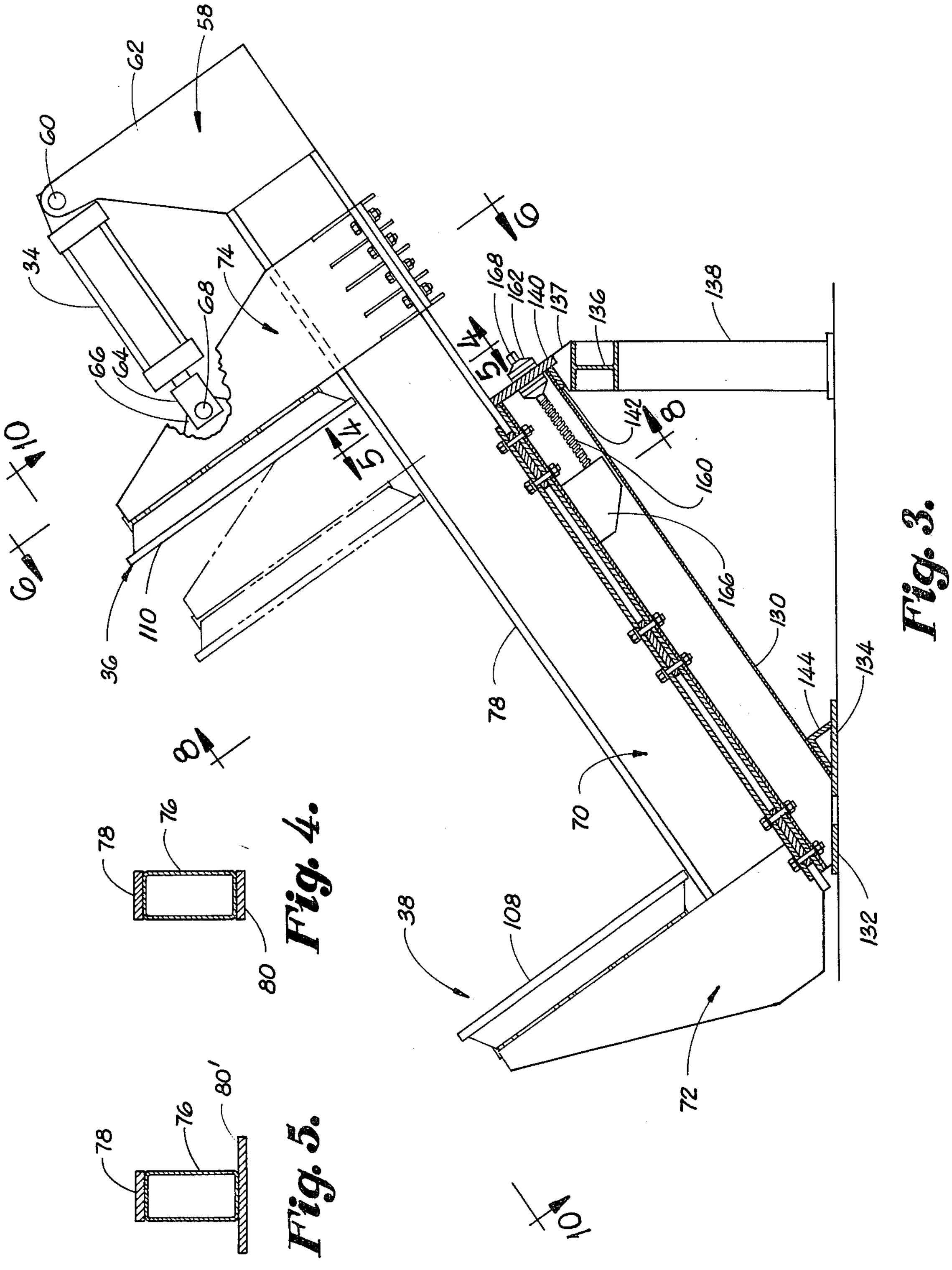
FIG. 3 is an enlarged vertical sectional view of the laminating press taken along the line 3—3 of FIG. 1.
FIG. 4 is a cross-sectional view taken along the line 4—4 of FIG. 3.
FIG. 5 is a cross-sectional view taken along the line 5—5 of FIG. 3.

Referring to FIG. 3, one of the identical clamping means 22 of the laminating press will be described. Each clamp of the press includes a main frame member 70 to which a lower platen support 72 and a hydraulic cylinder support 58 are rigidly attached and to which an upper platen support 74 is slidably attached. Main frame member 70 is composed of a rectangular steel tube 76 reinforced with steel plates 78, 80 welded to the upper and lower surfaces of the tube as shown in FIGS. 4 and 5. Upper steel plate 78 is the same width as the tube throughout the length of the main frame member, and its upper surface provides a board support surface for the stacks of boards within the clamp. However, lower steel plate 80 is the width of the tube only in the upper portion of the tube as shown in FIG. 4. In the lower portion of the tube, shown in FIG. 5, lower plate 80 is wider than the tube to provide flange plate means 80' for slidable attachment of the tube to an underpinning structure.

Figure 6:
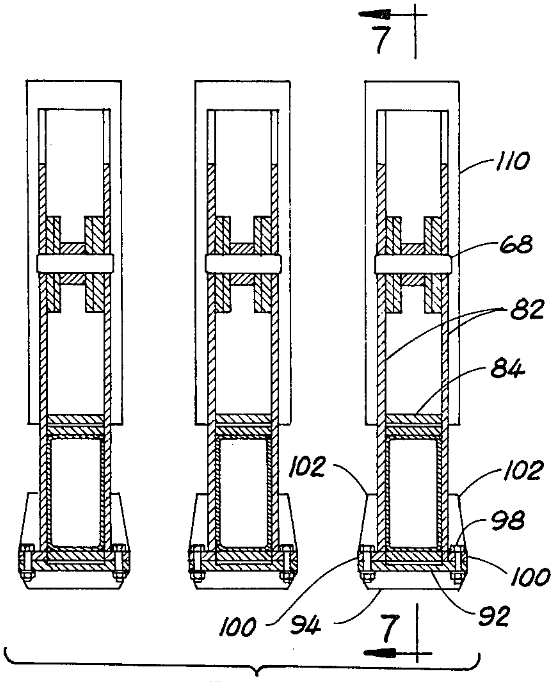
FIG. 6 is a cross-sectional view taken along the line 6—6 of FIG. 3 through a partial length of the press.
Figure 7:
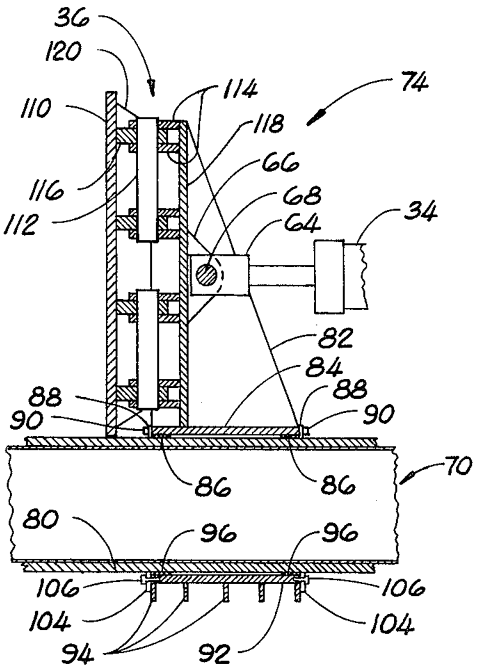
FIG. 7 is a partial vertical sectional view taken along the line 7—7 of FIG. 6.

Referring to FIG. 7 showing the details of the upper platen support structure 74, a steel plate 84 is welded to side plates 82. Plate 84 retains brass shoes 86 which bear against and slide along the upper surface of main frame member 70 when hydraulic cylinder 34 is actuated to move the upper platen into and out of its clamping position. Steel bars 88 attached to plate 84 with machine screws 90 hold brass shoes 86 in place. A steel plate 92 reinforced by gussets 94 retains brass shoes 96 which contact and slide along the lower surface of main frame member 70. Steel plate 92 is attached to side plates 82 by bolts 98, through a flange plate 100, as shown in FIG. 6. Flange plate 100, reinforced by gussets 102, is welded to side plates 82. Steel bars 104 attached to plate 92 with machine screws 106 hold brass shoes 96 in place.

An upper platen plate 110 of upper jaw structure 36 applies direct pressure to the boards within each clamp 22. Platen plate 110 is pivoted to the platen support structure 74 in the manner shown in FIGS. 7 and 10 for self-adjusting movement. Shafts 112 journaled in clevises 114 and eye bars 116 enable platen 110 to swing about the axis of such shafts to conform to the curvature of the laminated beam to be formed. Clevis bars 114 are welded to side plates 82 and to a thrust plate 118. Eye bars 116 are welded to the rear surface of platen 110 and to stiffener plates 120.

A lower platen plate 108, FIG. 3, of the stationary clamping jaw 38 is attached in similar fashion to lower platen support 72.

As shown best in FIGS. 3 and 7, hydraulic cylinder 34 for actuating upper jaw 36 is clevis mounted to hydraulic cylinder support 58 by a pin 60. Side plates 62 of hydraulic cylinder support 58 are welded to main frame member 70. A piston rod eye 64 of cylinder 34 is attached to upper platen support clevis 66 by a pin 68. Clevis 66 in turn is welded to thrust plate 118, as shown in FIG. 7.

Referring again to FIG. 3, each main frame member 70 is supported by an underpinning structure that serves as a clamp support means and includes multiple inclined beams 130 supported at their lower ends by base plates 132, 134 on the floor. Their upper ends are supported by a long beam 136 which runs the full length of the press. Beam 136 is in turn supported by steel posts 138 at intervals along its length. A bearing thrust plate 140 and a stiffener plate 142 also run the full length of the press and are joined to inclined beams 130 and to long beam 136 by bracket 137. A reinforcing angle member 144 runs the full length of the press at its base and is welded to the bottoms of inclined beams 130 and to base plates 134.

Figure 8:
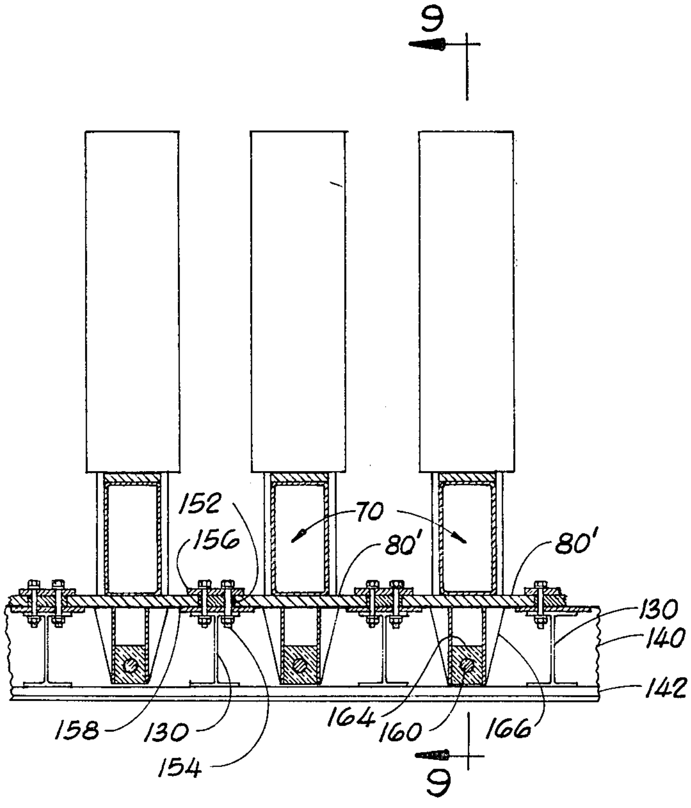
FIG. 8 is a cross-sectional view taken along the line 8—8 of FIG. 3 along a partial length of the press.
Figure 9:
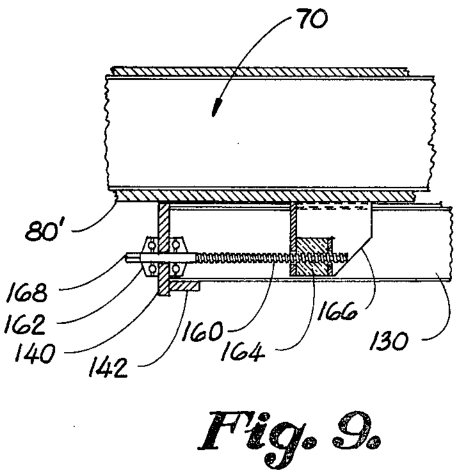
FIG. 9 is a partial vertical sectional view taken along the line 9—9 of FIG. 8.
Figure 10:
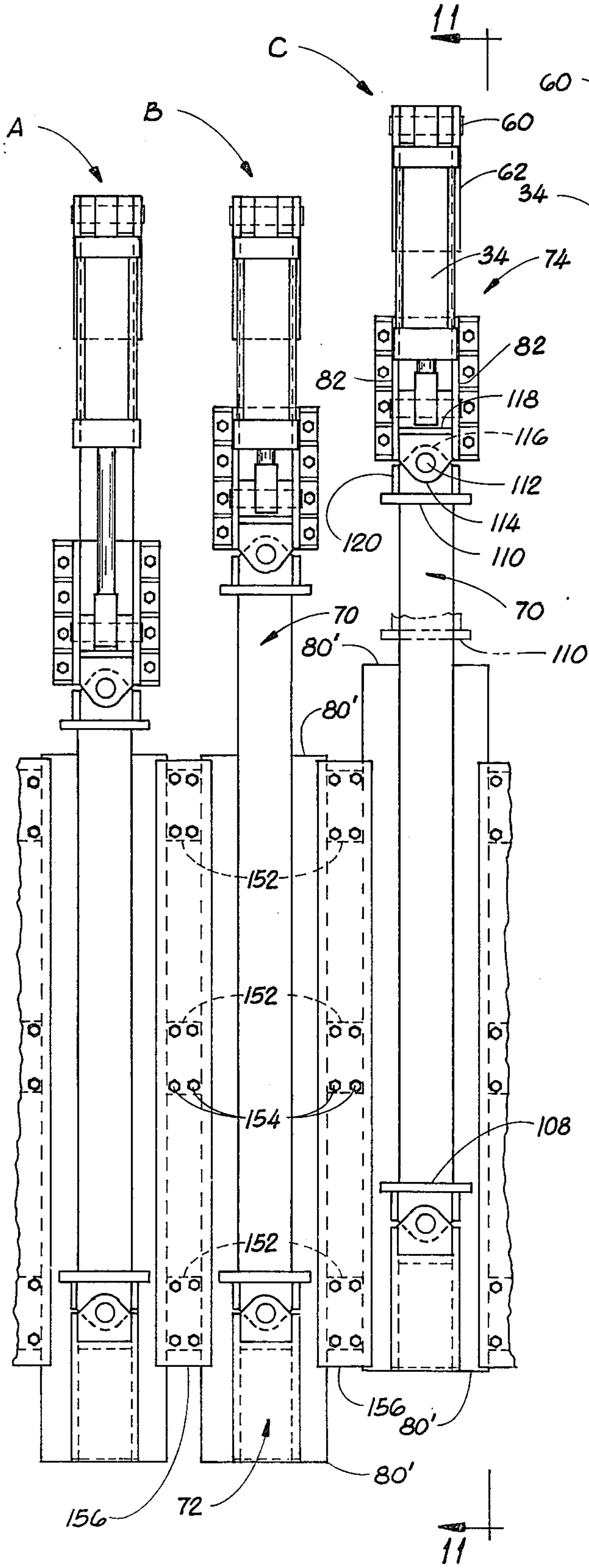
FIG. 10 is a top plan view of a portion of the length of the laminating press as viewed from the line 10—10 of FIG. 3.
Figure 11:
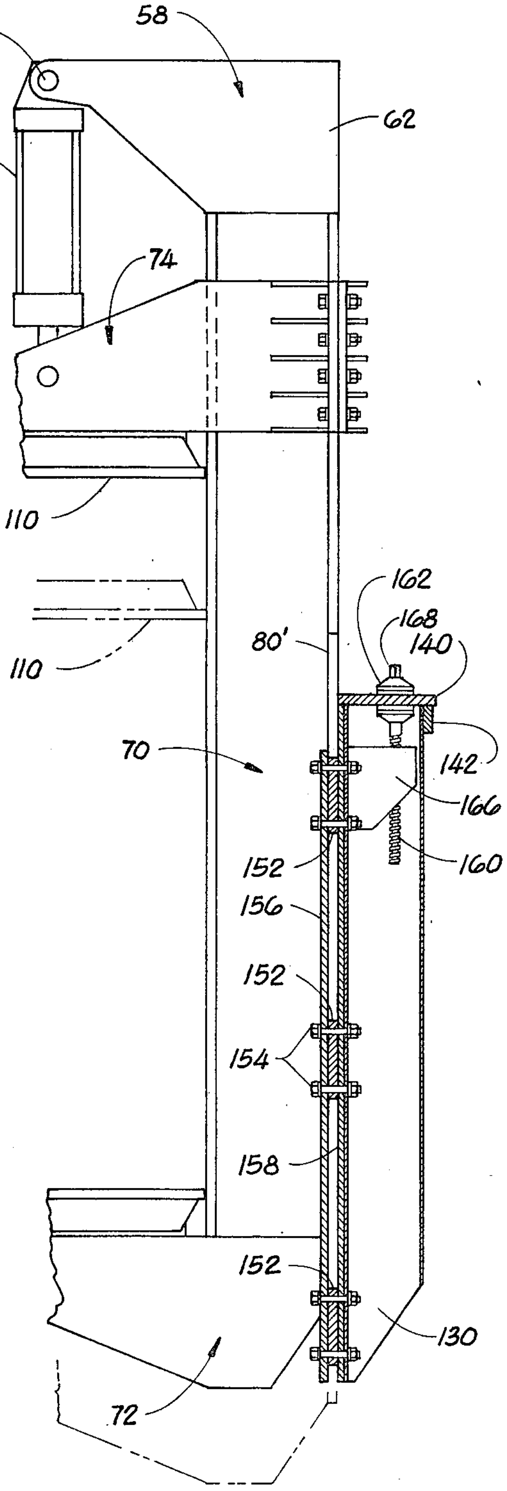
FIG. 11 is a partial vertical sectional view taken along the line 11—11 of FIG. 10.

FIGS. 8-11 show the details of slidable attachment of main frame members 70 to the underpinning structure just described which allows for their adjustability. FIG. 10 shows a series of three adjacent ones of main frame members 70 and the interrelationship of such main frame members and their attachments. FIG. 11 shows the positioning and adjustability of each main frame member 70 on the underpinning structure. Referring to FIGS. 8, 10 and 11, the wide lower flange plates 80' of main frame members 70 are spaced from each other by spacer bars 152 and are slidably retained between upper retainer plates 156 and lower runner plates 158. Bolts 154 extend through retainer plates 156, spacer bars 152, runner plates 158 and inclined beam 130 to hold the main frame members 70 in place and yet allow them to slide along inclined beams 130 when a lead screw 160 associated with each inclined beam is turned.

The lead screws 160 provide an adjustment means for determining the camber or curvature of the laminated beams to be formed. Each lead screw 160 is fixed to longitudinal plate 140 of the underpinning structure by a commercially available thrust bearing 162. A lead screw nut 164 is mounted in a bracket 166 which is welded to the wide lower flange plate 80′ of each main frame member 70. The turning of a lead screw 160, either by hand or by air-operated wrench fitted to wrenching head 168, moves its associated main frame member 70 individually along its associated inclined beam 130 to adjust the position of the attached stationary lower clamping jaw 38 relative to the lower clamping jaws of the other clamps of the press. Thus by progressively adjusting the lead screw of each clamp a predetermined amount, the desired curvature or camber of the beam can be predetermined. For example, in FIG. 10, clamp assembly C is shown at its upper positioning limit whereas the adjacent clamp assemblies A and B are shown at their lower limits of positioning on the underpinning structure. Hydraulic cylinder 34 for clamp assembly A is extended in its clamping position, and hydraulic cylinder 34 for clamp assembly B is shown in its retracted position for loading. The hydraulic cylinder 34 for clamp assembly C is shown retracted for loading in its full-line position and in its extended, clamping position in broken lines. A comparison of FIGS. 11 and 3 shows the frames 70 for the clamps at their upper and lower limits of movement, respectively, on inclined beam 130.

Alignment Bars

As previously mentioned, alignment means are provided for aligning or squaring the sides of the inclined stacks 32 of boards within the press. These means comprise a series of the alignment bars 50 which extend parallel to the inclined plane of the clamps and are movable from retracted positions into operative positions overlying the board stacks within the clamps. Details of one representative such alignment bar 50 are shown in FIGS. 12–15 and will be described. A series of seven such alignment bars is provided at regular intervals along the length of the press shown in FIG. 1. They are positioned so as to be movable into engagement with the upper side of the lumber stacks 32 within the press, between adjacent pairs of clamps.

Figure 12:
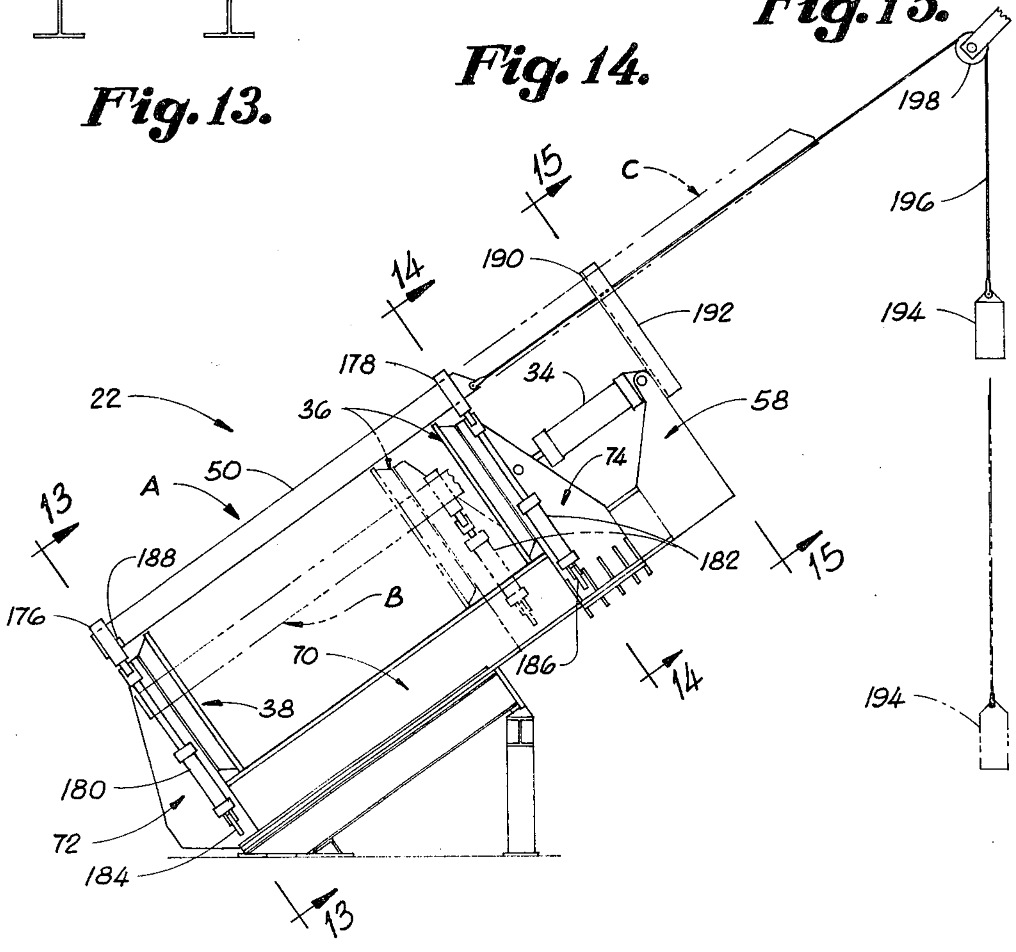
FIG. 12 is an enlarged vertical sectional view taken along the line 12—12 of FIG. 1 showing the laminating press in side elevation.

Alignment bar 50 is restrained in a lower yoke or guide means 176 at its lower end and in an upper yoke or guide means 178 at its upper end, when in an active position overlying the stacks of lumber within the press as shown in FIG. 12. The two yokes are threaded onto the outer ends of the piston rods of a pair of hydraulic cylinders 180, 182 which serve as alignment bar operating means. The cylinders in turn are pivoted at their lower ends on brackets 184, 186 fixed to the lower platen support 72 and upper platen support 74, respectively. Accordingly, lower alignment bar cylinder 180 on lower platen support 72 is fixed in position on main frame members 70, and upper alignment bar cylinder 182 moves with the attached upper platen support 74 along main frame member 70 when clamping cylinder 34 is actuated. Compare, for example, the positions of upper cylinder 182 in FIG. 12 as clamping cylinder 34 shifts upper clamping jaw 36 from its solid line position to its broken line position shown.

In FIGS. 12–15, alignment bar 50 is shown in an elevated position in solid lines, with the alignment bar activating cylinders 180, 182 extended. Retraction of such cylinders draws the alignment bar from its solid-line position A of FIG. 12 to its broken-line position B until the alignment bar engages the upper side of the uppermost stack of lumber in the press to apply a squaring pressure normal to the inclined plane of the press against the sides of the boards in the stacks, thereby to align the sides of the boards of all stacks and hold them in alignment.

Figure 13:
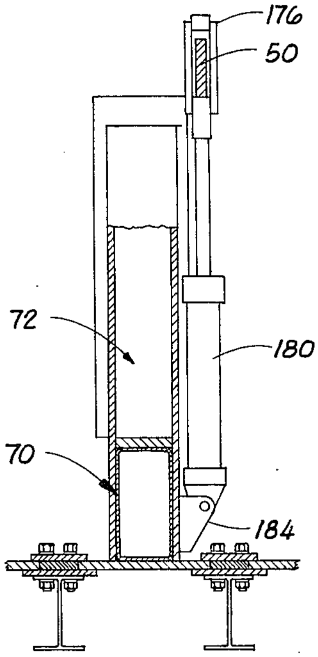
FIG. 13 is a sectional view taken along the line 13—13 of FIG. 12.
Figure 14:
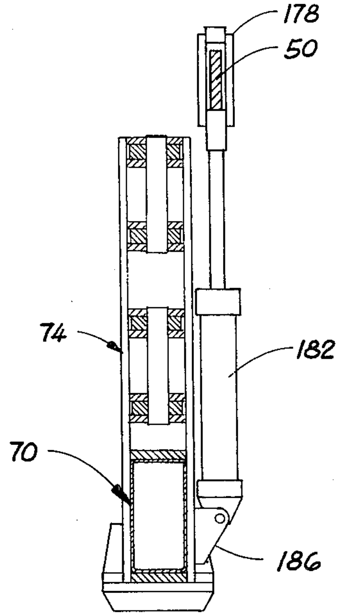
FIG. 14 is a sectional view taken along the line 14—14 of FIG. 12.

As will be apparent from FIGS. 13 and 14, alignment bar 50 fits loosely in yokes 176, 178 to enable easy retraction of the bar from a position overlying the clamp jaws from the charge of lumber within the press in a direction along its axis. Bar 50 is limited in its axial movement in a downward direction by a stop 188 affixed to it near its lower end. Such stop contacts an upper edge of lower yoke 176 as shown in FIG. 12. Upward axial movement of alignment bar 50 is stopped by the same stop 188 when it contacts the lower edge of upper yoke 178 to position the alignment bar in its fully retracted position C shown in broken lines in FIG. 12.

Figure 15:
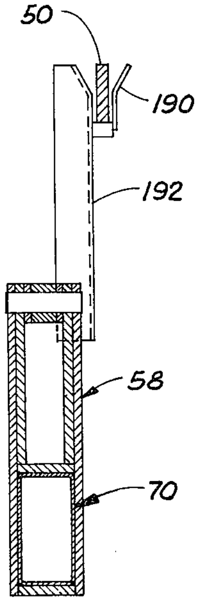
FIG. 15 is a sectional view taken along the line 15—15 of FIG. 12.

A guide 190 on a support member 192, shown in FIGS. 12 and 15, is fixed to hydraulic cylinder support 58 and helps support the alignment bar in its retracted position C. The alignment bar is counterbalanced by a weight 194 acting through a cable 196 trained over a pulley 198 to provide a retraction means which enables easy retraction of the bar by hand.

Infeed Conveyor

The infeed conveyor means for delivering boards into the press, comprising the plural conveyor arms 18 shown schematically in FIGS. 1 and 2, are illustrated in detail in FIGS. 16–27. All of the conveyor arms, of which there are five shown in FIG. 1, are identical and therefore only one will be described in detail.

Figures 16, 17, 18, 19, 20:
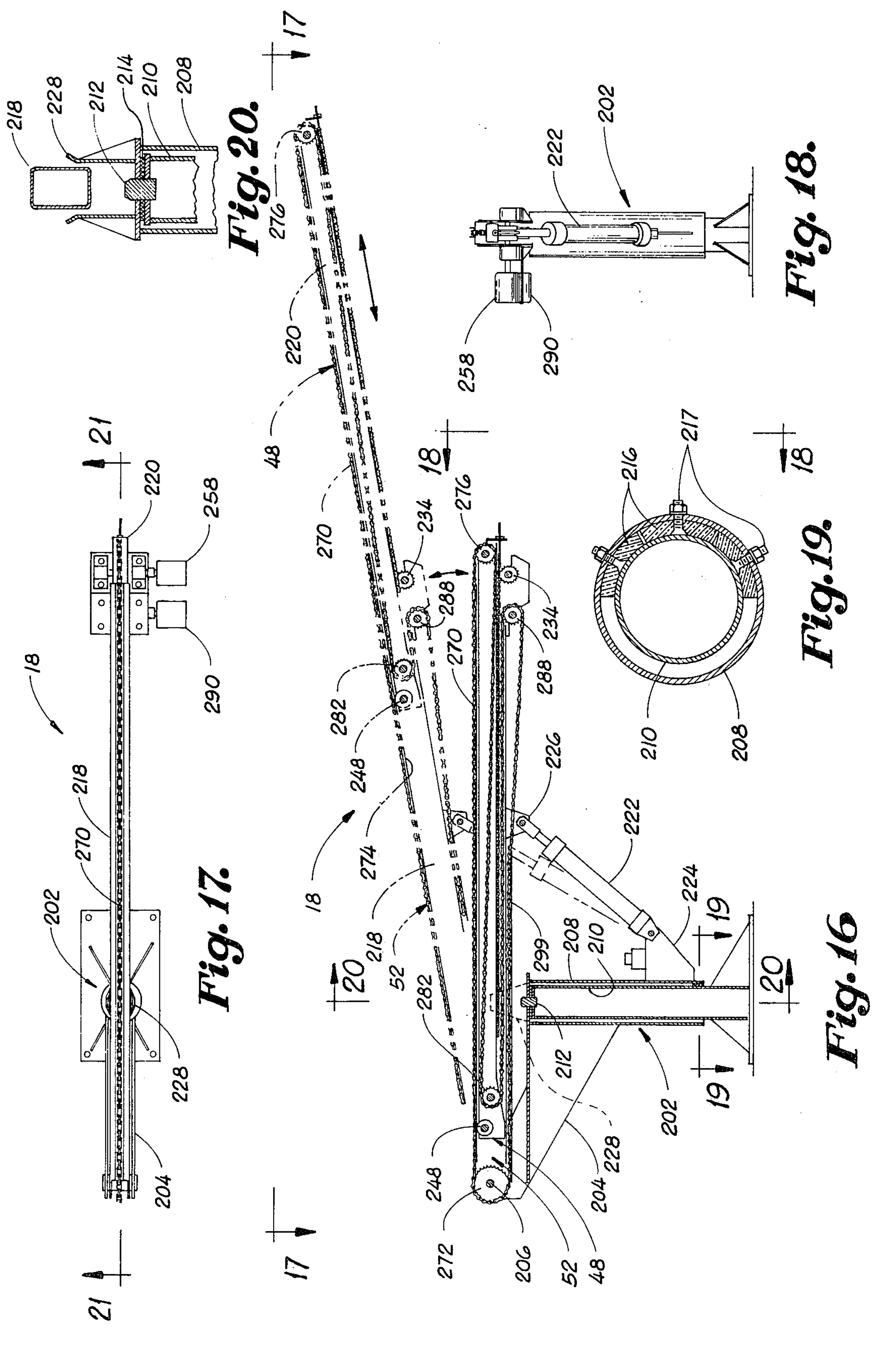
FIG. 16 is an enlarged vertical sectional view taken along the line 16—16 of FIG. 1 showing an infeed conveyor arm in its retracted position in full lines and in its extended position in phantom lines.
FIG. 17 is a top plan view of an infeed conveyor arm portion of the system as viewed from the line 17—17 of FIG. 16.
FIG. 18 is a front elevational view of an infeed conveyor arm of the system as viewed from line 18—18 of FIG. 16.
FIG. 19 is an enlarged horizontal sectional view taken along the line 19—19 of FIG. 16.
FIG. 20 is an enlarged partial vertical sectional view taken along the line 20—20 of FIG. 16.

As shown in FIG. 16, each conveyor arm assembly 18 is supported by a stand 202 bolted to the floor. More specifically, the conveyor arm assembly is attached to a bracket 204 by a horizontal transverse pivot shaft 206. Bracket 204 is welded to an outer sleeve 208 of stand 202. Outer sleeve 208 is rotatably mounted on a pipe column 210 of the stand in the manner shown in FIGS. 19 and 20. At the upper end of the support, outer sleeve 208 bears on the top end of pipe column 210 and is there held in position by a vertical pivot pin 212 to enable swinging movement of the conveyor arm assembly about the vertical axis of such pin. Pin 212 is welded to pipe column 210. A flat bronze shoe 214 provides a bearing surface for the outer sleeve 208 and its supported load. At its lower end outer sleeve 208 thrusts against pipe column 210 as shown in FIG. 19. Segmented bronze shoes 216, held in place by suitable fasteners 217, provide a thrust-bearing surface.

The telescoping outer section 48 and innermost arm section 52 of the conveyor arm assembly comprise two rectangular steel tubes, including an outer tube 218 for the inner arm section and an inner extension tube 220 that telescopes inside outer tube 218. Outer tube 218 is attached to bracket 204 by the previously mentioned pivot shaft 206. The outer tube can be raised or lowered about the axis of shaft 206 by a hydraulic elevating cylinder 222. The cylinder is clevised at its lower end to a bracket 224 welded to outer sleeve 208, and at its upper end to a bracket 226 welded to outer tube 218. A guide means comprising a pair of guide plates 228, shown best in FIG. 20, laterally restrains outer tube 218 in its lowered position and secures the conveyor arm assembly when it is rotated by hand into either its operating position or its storage position 30 depicted in FIG. 1.

Figure 21:
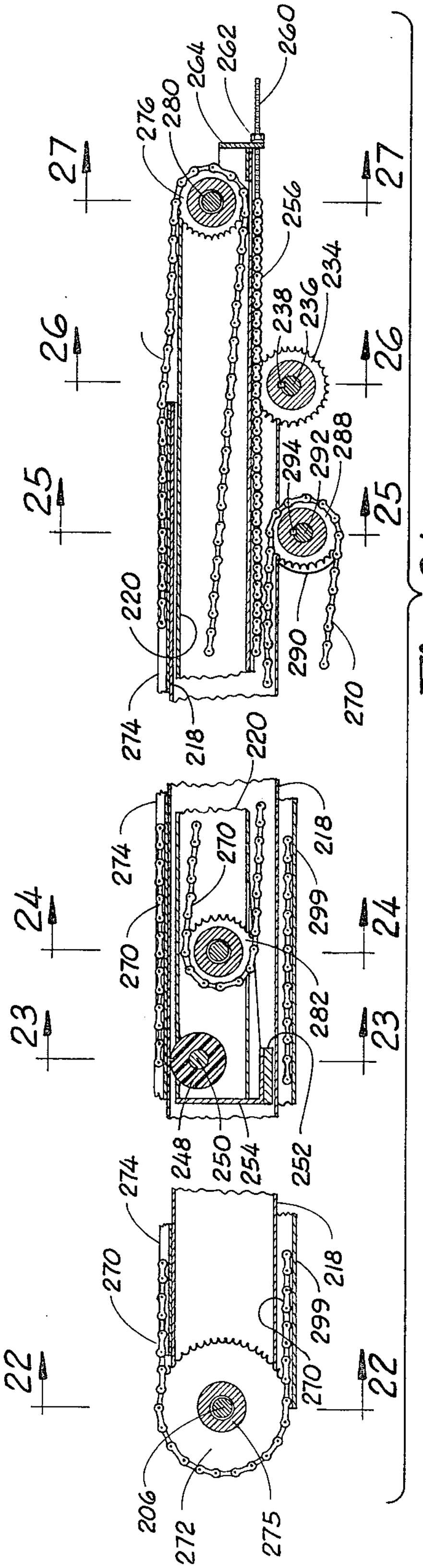
FIG. 21 is an enlarged foreshortened vertical sectional view taken along the line 21—21 of FIG. 17.

An endless chain 270, shown best in FIGS. 16 and 21, conveys boards one at a time from the transfer conveyor to the laminating press. Chain 270 passes about an idler sprocket 272 on pivot shaft 206, runs in a channel 274 along the upper surface of outer tube 218, then along the top of extension tube 220, and around an idler sprocket 276 at the offbear end of extension tube 220. The conveyor chain then passes inside extension tube 220 from its outer end and over an idler sprocket 282 at the inner end of the extension tube. From there the chain passes about a drive sprocket 288 and returns to idler sprocket 272 along an angle track 299 extending along the bottom of the outer tube as shown most clearly in FIGS. 21-24.

Conveyor chain 270 is driven by a hydraulic motor 290 shown in FIGS. 17, 18, 21, and 25. Motor 290 acts through a drive shaft 292 and key 294 to drive sprocket 288. Shaft 292 is mounted in bearings 296 (FIG. 25) which are attached to brackets 298 fixed to outer tube 218.

Figure 22:
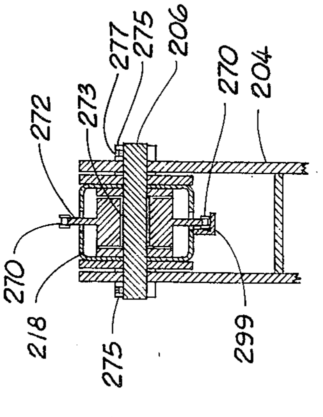
FIG. 22 is a cross-sectional view taken along the line 22—22 of FIG. 21.
Figure 24:
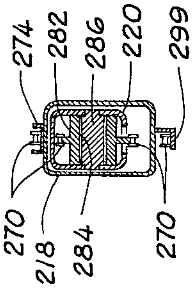
FIG. 24 is a cross-sectional view taken along the line 24—24 of FIG. 21.

Idler sprocket 272, as shown in FIG. 22, runs in a bushing 273 on pivot shaft 206. Shaft 206 is held in position and restrained from rotating by collars 275 with set screws 277. Idler sprocket 276, shown best in FIGS. 21 and 27, runs in a bushing 278 on a shaft 280. Shaft 280 is held in position and restrained from rotating by flats on the shaft ends set into slots in tube 220. Chain 270 returns to sprocket 272 along the angle track 299 previously mentioned, which is attached to the lower outer surface of outer tube 218, as shown best in FIGS. 21-24.

Figure 26:
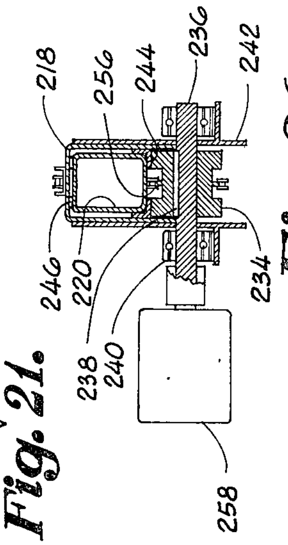
FIG. 26 is a cross-sectional view taken along the line 26—26 of FIG. 21.
Figure 25:
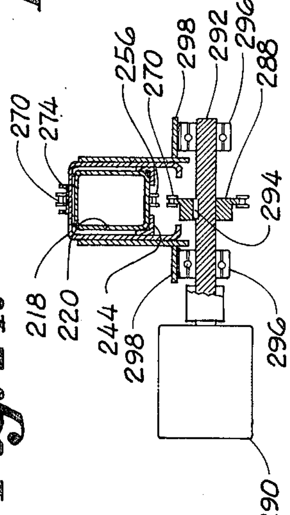
FIG. 25 is a cross-sectional view taken along the line 25—25 of FIG. 21.
Figure 27:
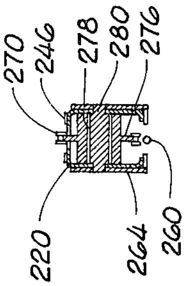
FIG. 27 is a cross-sectional view taken along the line 27—27 of FIG. 21.

As shown in FIGS. 21 and 26, extension tube 220 is supported at the outboard end of outer tube 218 by a roller sprocket 234. Extension tube 220 is extended and retracted by the sprocket teeth on roller-sprocket 234 engaging and driving a length of chain 256 which is secured to the lower surface of extension tube 220. Roller sprocket 234 is driven through a shaft 236 and key 238 by a hydraulic motor 258 which is remotely actuated by the machine operator from the remote control panel 56 shown in FIG. 1. Extension chain 256 is maintained under tension by an adjustment screw 260 and jam nut 262 attached to a bracket 264 at the outer end of extension tube 220. Angles 244 attached to the lower surface of extension tube 220 (FIG. 26) center the extension tube inside outer tube 218 and form a running surface for the roller bearing portion of roller-sprocket 234. Spacer strips 246 attached to the top of extension tube 220 provide clearance for extension tube 220 within the outer tube as it telescopes within the outer tube.

Figure 23:
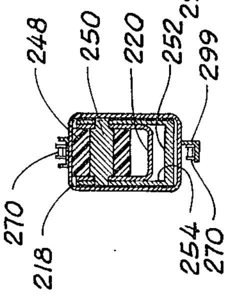
FIG. 23 is a cross-sectional view taken along the line 23—23 of FIG. 21.

The inboard end of extension tube 220, as shown best in FIGS. 21 and 23, bears upward against the upper inside surface of outer tube 218 through a synthetic roller 248 which rotates on a shaft 250 mounted within extension tube 220. A shoe 252 attached to a bracket 254 welded to the outer bottom surface of extension tube 220 at its inboard end maintains clearance between the bottom surface of extension tube 220 and the bottom inside surface of outer tube 218 when the extension tube is extended and retracted.

Summarizing the operation of the infeed conveyor arm assemblies, the outer arm section, or extension tube, can be extended and retracted by operating the reversible hydraulic motor 258 from the remote control panel 56. The conveyor arm assembly can also be raised and lowered through remote operation of the hydraulic elevating cylinder 222 from the same panel. Similarly, boards on the conveyor chains 270 of the arms can be delivered to the press, held in position, or conveyed in reverse on the arms through selective operation of the reversible hydraulic chain drive motors 290 from the remote control panel.

All of the infeed conveyor arms can be operated simultaneously to assume identical positions through a common hydraulic control circuit to be described. Thus a single operator at the remote control panel 56 is able to position the offbear ends of all of the infeed conveyor arms at any desired position with respect to the board-receiving space between the multiple pairs of clamping jaws of the laminating press as shown best in FIG. 2 to minimize manual handling of the boards in loading the press.

Hydraulic System

Figure 29:
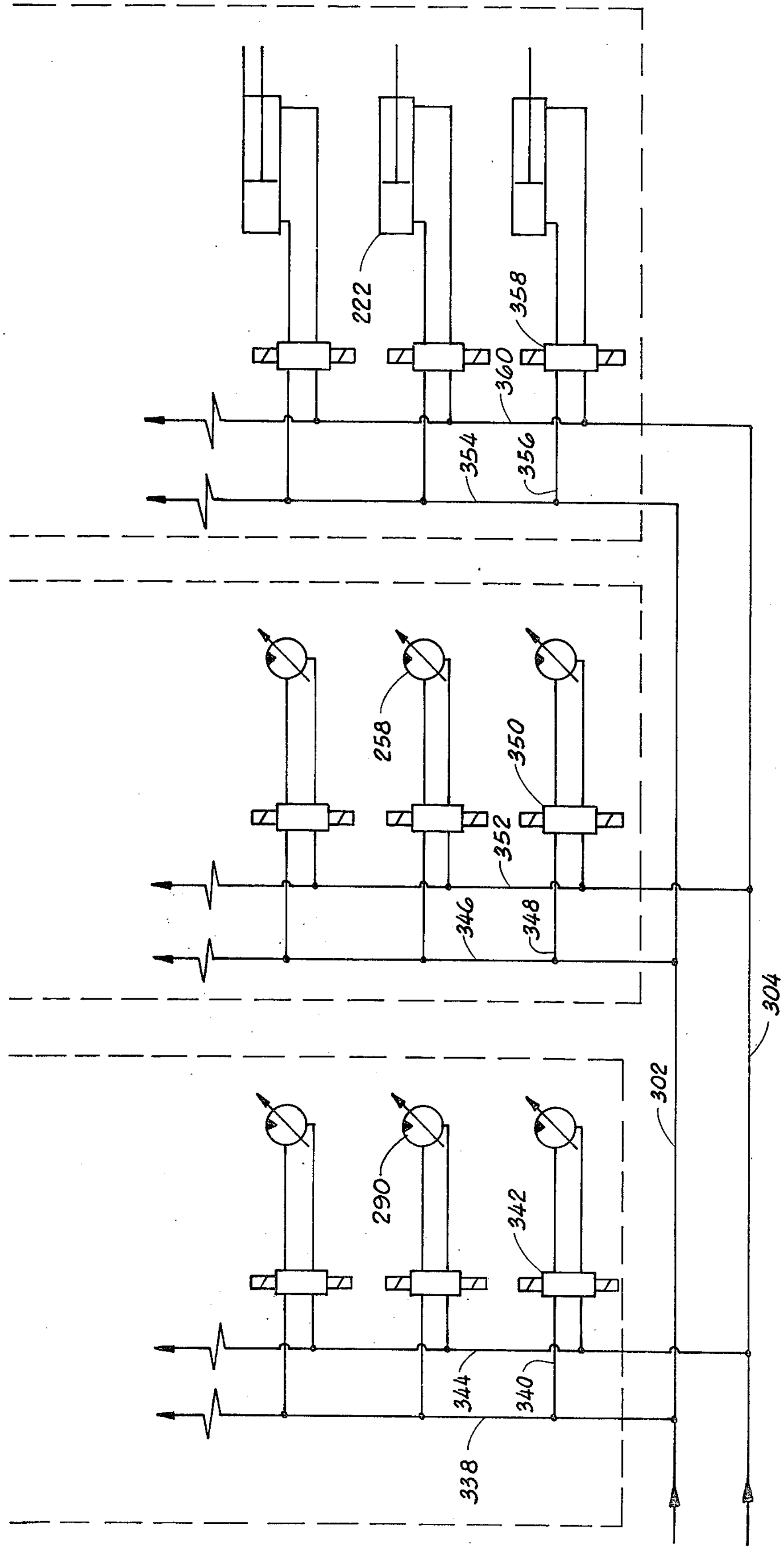
FIG. 29 is a hydraulic circuit diagram of the hydraulic circuit for operating the infeed conveyor arm chain drive motors, arm extension motors and arm-elevating cylinders.

The hydraulic circuitry for operating the various hydraulic components of the described board delivery, lay-up and laminating system is shown schematically with reference to FIGS. 28 and 29.

The hydraulic system includes a high pressure supply circuit represented by high pressure supply line 300 and a low pressure hydraulic circuit represented by low pressure supply line 302. The high pressure line 300 serves the alignment bar cylinders 180, 182 and the hydraulic clamping cylinders 34. Low pressure supply line 302 also serves the clamping cylinders 34 and serves the infeed conveyor means, including the infeed conveyor chain drive motors 290, extension tube drive motors 258, and conveyor arm elevating cylinders 222, as shown in FIG. 29. A common drain line 304 serves both the high pressure and the low pressure circuits to return fluid from the hydraulic components to a reservoir 306.

The hydraulic pumping system is represented by the components within the broken-line rectangle 308 in FIG. 28. Such pumping system includes a plurality of at least two low pressure variable displacement pumps 310 driven by electric motors 312 to supply fluid under a relatively constant predetermined low pressure through gate valves 314 to the low pressure supply line 302. The high pressure pumping system includes a plurality of at least two high pressure variable displacement pumps 316, each driven by an electric motor 318 to supply fluid under a relatively constant high pressure through check valves 320 and gate valves 322 to the high pressure supply line 300. The high pressure pumping system also includes a standby high pressure pump 324 driven by a standby diesel engine 326 which supplies fluid under the predetermined high pressure through a check valve 327 and gate valve 328 of a high pressure supply line 330 leading to the primary high pressure supply line 300. The standby pump is used in case of a malfunction of the primary high pressure pumping system, such as a loss of electrical power.

The standby high pressure pumping system is required to enable the clamping cylinders 34 to maintain a predetermined high bonding pressure on the boards in the laminating press during the several hours required for the glue between the boards to adequately set and cure. Should a loss of the required high clamping pressure occur during the critical curing period, the entire load of laminated beams in the press, which may be worth many thousands of dollars, would have to be scrapped. The standby diesel engine 326 is provided with an automatic starting means 332 of conventional design which is responsive to a pressure drop in the high pressure supply line 300 to start the diesel engine and thus the standby pump 324 immediately upon sensing the pressure drop.

Low pressure line 302 supplies fluid through branch lines 334 and manually operated four-way valves 336 selectively to the opposite ends of the hydraulic clamping cylinders 34. The low pressure line 302, as shown in FIG. 29, also supplies fluid through branch supply lines 338 and 340 and through solenoid-operated four-way valves 342 to the reversible infeed conveyor chain drive motors 290. A branch drain line 344 returns fluid from the chain drive motors to the primary drain line 304 for return to the reservoir.

Low pressure supply line 302 also supplies fluid through a branch supply line 346 and connected branch supply lines 348 to solenoid-operated four-way valves 350 which selectively supply fluid to the opposite ends of the reversible extension tube drive motors 258. A branch drain line 352 returns fluid from such motors to the primary drain line 304 for return to the reservoir.

Finally, low pressure supply line 302 supplies pressure fluid through a low pressure supply line 354 and connected branch lines 356 to solenoid-operated four-way valves 358 which selectively direct the low pressure fluid to the opposite ends of the double-acting hydraulic conveyor arm elevating cylinders 222. A branch drain line 360 leads hydraulic fluid from such cylinders back to the primary drain line 304 for return to the reservoir.

The four-way solenoid-operated valves 342, 350 and 358 for operating the conveyor chains, extension tube drive motors, and conveyor arm elevating cylinders are all operable from the remote control panel 56 shown in FIG. 1. Thus a single operator has complete control over the infeed of boards to the board-laminating press 20. The operator can selectively hold boards on the infeed conveyor arms by maintaining the chain drive motor control valves 342 in their neutral positions or can cause movement of a board along the conveyor arms in either direction through selective operation of the valves 342.

Similarly the operator at remote control panel 56 can control the extension and elevation of the offbear ends of the conveyor arms for deposit of boards at desired positions within the laminating press through selective operation of the extension tube control valves 350 and conveyor arm elevation control valves 358.

Referring now to the supply of fluid through the high pressure supply line 300, fluid under high pressure is supplied simultaneously to one set of ends or the other of the alignment bar actuating cylinders 180, 182 through branch high pressure supply lines 362 and manually operated four-way control valves 364. The valves may be positioned in convenient locations adjacent to the laminating press. Branch drain lines 364 lead from the alignment bar cylinders back to the primary drain line 304 for return of the fluid to the reservoir 306.

The high pressure supply line 300 also supplies fluid under high pressure to the clamp cylinders 34 through branch supply lines 368 and manually operated four-way valves 370 to the extension ends of the clamping cylinders 34. A branch drain line 372 returns fluid from the cylinder through either the low pressure valve 336 or high pressure valve 370, whichever is in use, to the primary drain line 304 for return to the reservoir 306.

Operation of Board-Laminating Press

While the press 20 is being charged, all of its clamps 22 are maintained in their open positions through retraction of clamping cylinders 34 and thus upper jaws 36.

The press is loaded by stacking the boards to be laminated one at a time into the press between the pairs of upper and lower clamping jaws starting at the lowermost corner of the lower stationary clamping jaw and working upwardly toward the upper clamping jaw and then starting a second layer of boards above the lowermost layer again from the lower clamping jaw toward the upper, until the jaws are filled to capacity with several layers of board stacks, each stack comprising one or possibly several laminated beams to be formed. During the loading operation, the offbear ends of the conveyor arms are positioned as close as possible to the final destination of each board in the press. When the press is filled to capacity or to the extent desired, the infeed arms are withdrawn and the press is ready for operation.

First, the manually operated four-way valves 336 in the low pressure system for the clamping cylinders 34 are manipulated to extend all of the clamping cylinders 34 and thereby move all of the upper clamping jaws into engagement with the upper surfaces of the board stacks within the press and apply a low clamping pressure of, for example, about 50 psi to the stacks through the upper and lower clamping jaws.

Then the manually operated four-way valves 364 for the alignment bar cylinders 180, 182 are operated to retract such cylinders downwardly, thereby drawing the alignment bars 50 into engagement with the sides of the stacks of boards within the press to square or align the sides of the stacks and hold them in alignment.

Then the manually operated four-way high pressure valves 370 of all of the clamping cylinders 34 are operated to apply a high bonding pressure of, for example, about 125 psi through the upper jaws to the stacks within the press. Such high pressure is maintained while the alignment pressure is maintained through the alignment bars until the glue between the boards in the various stacks has cured.

When the glue has cured, requiring several hours, the high pressure valves 370 for the clamping cylinders are returned to their neutral positions and the low pressure valves 336 are operated to retract the clamping cylinders and thereby open the clamps. At the same time, alignment bar valves 364 are operated to extend the alignment bar cylinders and raise the alignment bars. Thereafter workmen pull them to their retracted out-of-the-way positions so that the laminated beams can be lifted from the press.

The laminated beams can be conveniently removed from the press using an overhead gantry crane or other suitable lifting means. The angle of inclination of the press permits such vertical removal while also enabling convenient loading of the press using the conveyor arms 18.

Having illustrated and described the principles of our invention by what is presently a preferred embodiment thereof, it should be apparent to those persons skilled in the art that such embodiment may be modified in design, arrangement, and detail without departing from such principles. We claim as our invention all such modifications as come within the true spirit and scope of the following claims.

We claim:

1. A hydraulic board-laminating press for forming laminated wooden beams and the like comprising;

a series of generally laterally aligned closely spaced-apart board-clamping means, extending in a row through a distance substantially co-extensive with the length of a beam to be formed, each said clamping means including a pair of upwardly opening, parallel, spaced-apart board-clamping jaws with flat clamping faces extending normal to a straight board support surface, one of said jaws of a pair being stationarily mounted and the other jaw of said pair being movable toward and away from the stationary jaw along said support surface, hydraulic press-operating means for moving the movable jaw of each clamping means between open and closed positions relative to the stationary jaw and for applying a clamping pressure to boards positioned between said jaws of a pair, including a first control means for applying a pre-selected low clamping pressure through said movable jaw, and a second control means for applying a preselected high clamping pressure through said movable jaw, alignment means spaced at intervals along the length of said press between adjacent said clamping means for aligning the sides of boards of lumber stacked between the clamping jaw pairs of said press, said alignment means including a series of alignment bar means, each alignment bar means being positionable between an adjacent pair of said clamping means and parallel to the support surfaces of said clamping means, and hydraulic pressure operated alignment bar operating means for moving each said alignment bar when in its working position toward and away from the plane of said clamp support surfaces for selectively engaging and applying squaring pressure to the edges of boards lying between the pairs of clamping jaws.

2. A press according to claim 1 including camber adjustment means operable to adjust the position of the stationary jaw of each clamping means relative to the stationary jaws of the other clamping means of the series so as to provide a predetermined camber in laminated beams formed within said press.

3. A press according to claim 2 wherein said camber adjustment means for each clamping means includes screw-operated means for shifting the stationary clamping jaw parallel to the clamp support surface and in the directions of movement of the movable jaw of the same clamping means.

4. A press according to claim 1 wherein said alignment bar means includes a retraction means for moving each alignment bar means parallel to the support surfaces of said clamping means between a working position spanning the space between the line of movable jaws and the line of stationary jaws of the series of clamping means and a retracted position offset from said jaw space.

5. A press according to claim 1 wherein each alignment bar means includes a straight-edged alignment bar, guide means for supporting and guiding said alignment bar in endwise sliding movement between its working position and its retracted position, and alignment bar operating means including a pair of extensible hydraulic cylinders spaced apart along and normal to the plane of said clamp support surfaces, each of said pair of hydraulic cylinders being stationarily mounted at one end and the other extensible end mounting said guide means, said pair of hydraulic cylinders being operable together to move said alignment bar toward and away from the plane of said clamp support surfaces and into squaring engagement with the edges of lumber stacked between the pairs of jaws of said clamping means.

6. A press according to claim 5 including positioning means for shifting each alignment bar between its working position and its retracted position including a flexible cable means attached at one end to an end of said alignment bar and at its opposite end to a counterweight, and pulley means supporting said cable means between the alignment bar-connected end and the counterweight-connected end of said cable means.

7. A press according to claim 1 including clamp support means mounting each clamping means at an inclination to the horizontal such that the clamp support surfaces of all clamping means extend at substantially the same angle of inclination and such that the opening between the stationary and movable jaws of each pair of jaws opens upwardly and outwardly in the same direction.

8. A press according to claim 7 wherein said movable jaw of each pair of jaws is positioned above the stationary jaw of said pairs.

9. A press according to claim 8 including infeed conveyor means operable to feed boards of lumber sideways toward and into the openings between said jaw pairs.

10. A press according to claim 9 wherein said infeed conveyor means is longitudinally extensible and mounted for pivoting movement in a vertical plane so as to vary the vertical and longitudinal position of the offbear end of said conveyor means with respect to the jaw openings.

11. A press according to claim 9 wherein said infeed conveyor means includes a series of similar infeed conveyor arms spaced along the line of clamping means, said arms being cooperable to support boards of lumber spanning the distance therebetween and convey said boards sideways into said jaw openings.

12. A press according to claim 11 wherein each said infeed conveyor arm is extensible and retractable toward and away from said clamping means so as to selectively project the offbear end thereof into the clamping space between said multiple jaw pairs and is mounted for pivoting movement in a vertical plane for selectively adjusting the vertical position of said offbear end with respect to said clamping space, said arm including driven endless conveyor means for conveying lumber sideways therealong into various portions of said space as determined by the vertical and horizontal position of the offbear end of said arm.

13. A board-laminating press including:

a series of laterally aligned, closely spaced-apart board clamps mounted in a common inclined plane, each clamp having a pair of clamping jaws including a lower fixed jaw and an upper jaw movable toward and away from said fixed jaw by fluid pressure-operated means, a series of alignment bars spaced at intervals along the line of clamps and positionable parallel to said inclined plane in positions offset between adjacent clamps, fluid pressure-operated alignment bar operating means operable to move said alignment bars toward and away from stacks of boards extending between said pairs of clamping jaws while maintaining their parallel relationship to said inclined plane so as to selectively engage and align the sides of the stacks of boards between said clamp, hydraulic pressure control means operable selectively to apply a first predetermined low clamping pressure through said upper jaw and operable to apply a predetermined high clamping pressure through said upper jaw, means for retracting said alignment bars from their working positions spanning the space defined by said pairs of clamping jaws to enable generally vertical removal of laminated board products from between said pairs of clamping jaws, and means for feeding boards selectively and one board at a time sideways and generally horizontally between the pairs of clamping jaws in their open positions.

14. A press according to claim 13 including means for retracting said alignment bars from their working positions spanning the space defined by said pairs of clamping jaws to enable generally vertical removal of laminated board products from between said pairs of clamping jaws.

15. A press according to claim 14 including means for feeding boards selectively and one board at a time sideways and generally horizontally between the pairs of clamping jaws.

16. A press according to claim 13, including hydraulic circuit means for supplying hydraulic fluid under operating pressure to said fluid pressure-operated means for operating said upper movable jaws, said hydraulic circuit means including said hydraulic pressure control means, a first motor-pump set means for maintaining a predetermined hydraulic pressure in said circuit and a second standby motor-pump set means operable upon the failure of said first motor-pump set means to continue maintaining a predetermined hydraulic pressure in said circuit, thereby to enable maintenance of said high clamping pressure until glue-coated boards within said clamps have been bonded together permanently.

* * * * *